United States Patent Office 2,975,058
Patented Mar. 14, 1961

2,975,058
METHOD OF PRODUCING RICE FOODS

Augustine L. Colarusso, Boston, Mass., assignor to Van Brode Milling Co., Inc., Clinton, Mass., a corporation of Massachusetts No Drawing. Filed Mar. 12, 1956, Ser. No. 570,682

1 Claim. (Cl. 99—81)

The present invention relates to improvements in cereal foods, and more particularly to oven-puffed rice foods.

In recent years, confectionery manufacturers have put on the market chocolate bars which contain a substantial amount of ready-to-eat crisp rice. For this purpose, the manufacturers call for a small-sized rice and for kernels, or parts of kernels, of substantially the same shape throughout the mass. Hence, serious difficulties arise in attempting to meet the requirements of the trade. It has been proposed to use small-kernel whole rice and also broken rice kernels for the production of the oven-puffed crisp cereal, to be used as an ingredient of said bars. However, the employment of even the smallest size whole kernels resulted in a product too large for the purpose mentioned, and, when broken rice kernels were used, the shape of the resulting product could not be controlled and production problems arose which could not be easily overcome.

It is the object of the present invention to provide a process of making a crisp rice food, whereby both the size and shape of the product are predetermined and controlled; in other words, whereby a product is obtained, the individual elements of which are of substantially the same size and of substantially the same shape.

Another object of the invention is to furnish a process of obtaining crisp rice of spherical shape.

A further object of the invention is the provision of a process for producing a crisp rice product of spherical shape and predetermined size.

Other and more detailed objects of the invention will become apparent as the nature of the invention is better understood from the following description of the novel method.

In the manufacture of the improved product, not only the several commercial sizes of rice may be employed, including the smallest kernels, but also small particles or broken rice pieces may be used, the ordinary kernel size not being essential to the quality of the finished product.

Generally speaking, in the preparation of the product herein contemplated, the steps usually employed in the production of ready-to-eat crisp rice are carried out up to the point of the oven-puffing or toasting step, but, before the cereal is subjected to the last-mentioned step, the material is comminuted or reduced in size, according to the requirements; the comminuted material being thereafter oven-puffed or toasted and resulting in spherical pellets of substantially the same size.

Going now into the details of the process to illustrate but not to limit the invention:

(1) Any commercial size or broken rice, to which has been added a solution of water, salt and sugar, is placed into a, preferably, rotary steam cooker. By way of example, to 100 pounds of rice are added 4½ gallons of water, 2 pounds of salt and 6 pounds of sugar. The proportions of salt and sugar may be modified, as desired to suit the taste, and other flavoring materials may be added, as desired. Of course, any or all of the flavoring materials may be omitted without in any way affecting the novel process herein disclosed.

(2) The rice is cooked, for instance, under 15 pounds of steam pressure in the cooker until thoroughly cooked.

(3) The cooked material is then dried to a moisture content of, for instance, between 15% and 30%, to give it a rubbery consistency, and cooled, so as to yield individual kernels of rice having a rubbery texture.

(4) The dried and cooled grits are then tempered at, say, 70 degrees to 80 degrees Fahr., that is at room temperature, from 6 hours to an indefinite period, so as to evenly distribute the moisture in the material.

(5) The tempered rice is then passed through smooth flaking rolls, so adjusted as to slightly compress and deform the material, without, however, reducing the same to flakes.

(6) The deformed material is thereupon dried to about 8 to 12% moisture content.

The steps of the process so far described are those heretofore normally practiced in the production of ready-to-eat crisp rice. It is at this point of the method that the step resulting in the production of the improved product is added to the conventional procedure. This step may be described as follows:

(7) The deformed and dried rice is comminuted, in any suitable crusher or granulator, to coarse particles of a size which, when oven-puffed, are enlarged to the required dimensions. In practice it has been found that, for the purpose of obtaining crisp rice of the size called for by the confectionery trade, the deformed, dried rice must be comminuted to coarse particles of about $50/1000$ of an inch (.050") in its three dimensions, although satisfactory results have been obtained with sizes somewhat greater or less than this.

The fragmentation of the rice after the drying step following the deformation has an additional function, namely it causes every coarse particle to assume a fixed shape during the puffing operation, which is as follows:

(8) The granulated material is placed into an oven, for instance a rotary oven, at a temperature of, say, 450 degrees to 600 degrees Fahr., until the food is properly puffed or toasted. The particles swell or expand to several times their initial volume, attain a brown color and a spherical shape.

Finally:

(9) The pellets are screened, to remove from the mass such as may be above the required size, due to imperfections of the comminutor. However, these oversized pellets are not wasted, since they have the same physical characteristics as the crisp rice food product processed as a ready-to-eat food. Hence, the oversized pellets are adapted to be mixed with the regular run of production where the size of the product is of no particular consequence.

It is understood that the invention is not limited to the specific apparatus, temperatures, sizes and moisture contents above referred to, the example cited being

What I claim is:

A method of making a ready-to-eat cereal food, comprising cooking rice in moisture, partially drying the cooked rice, compressing and deforming the cooked rice without, however, reducing the same to flakes, drying the deformed rice to a moisture content of between 5 and 14%, reducing the rice to coarse particles of approximately 50/1000 of an inch in its three dimensions, and thereafter subjecting said particles to heat at a puffing temperature whereby they are expanded into spherical pellets.

References Cited in the file of this patent

UNITED STATES PATENTS

| 1,399,920 | Baumgartner | Dec. 13, 1921 |
| 1,925,267 | McKay | Sept. 5, 1933 |
| 2,295,116 | Kellogg | Sept. 8, 1942 |
| 2,643,951 | Alderman et al. | June 30, 1953 |

FOREIGN PATENTS

| 300,261 | Great Britain | Apr. 8, 1930 |